Dec. 16, 1930.  T. F. COONEY  1,785,477
AIRPLANE
Filed Sept. 5, 1928  2 Sheets-Sheet 1
Fig.1.
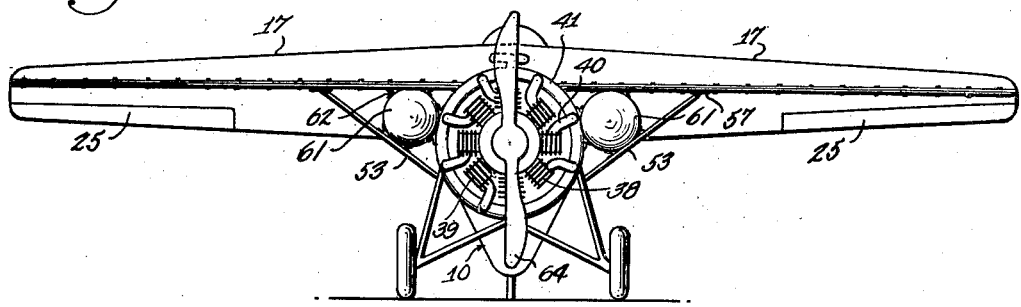
Fig.2.
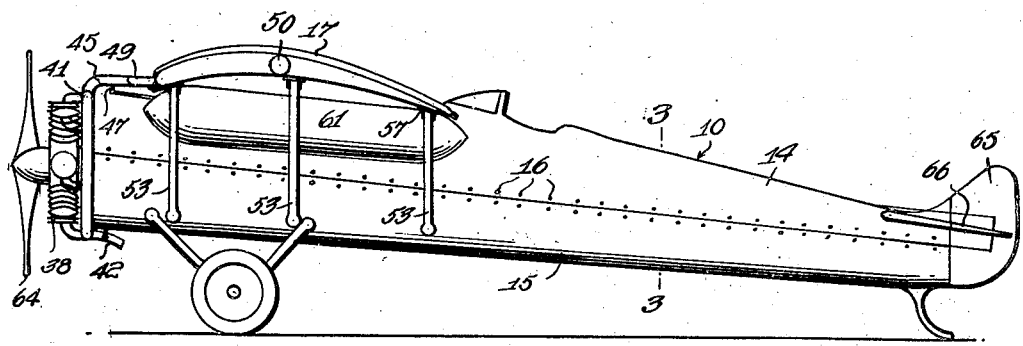
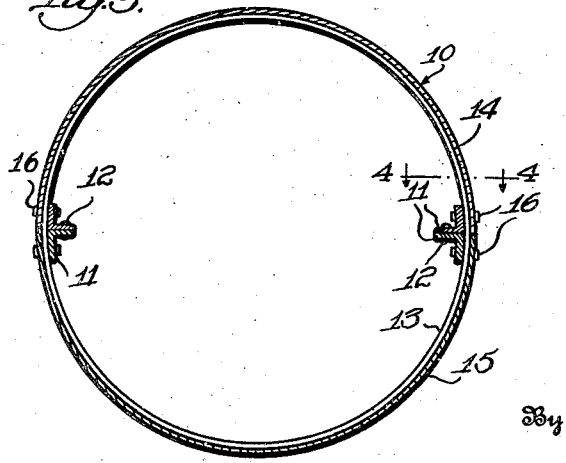
Fig.3.  Fig.4.
Inventor
THOMAS F. COONEY
By C. L. Parker Jr.
Attorney Dec. 16, 1930.  T. F. COONEY  1,785,477
AIRPLANE
Filed Sept. 5, 1928   2 Sheets-Sheet 2
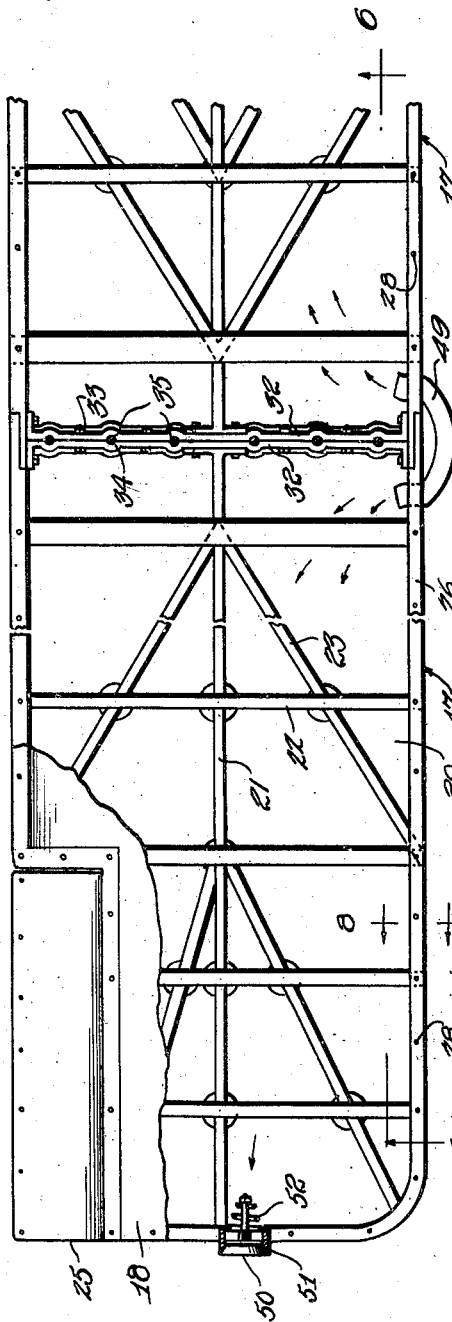
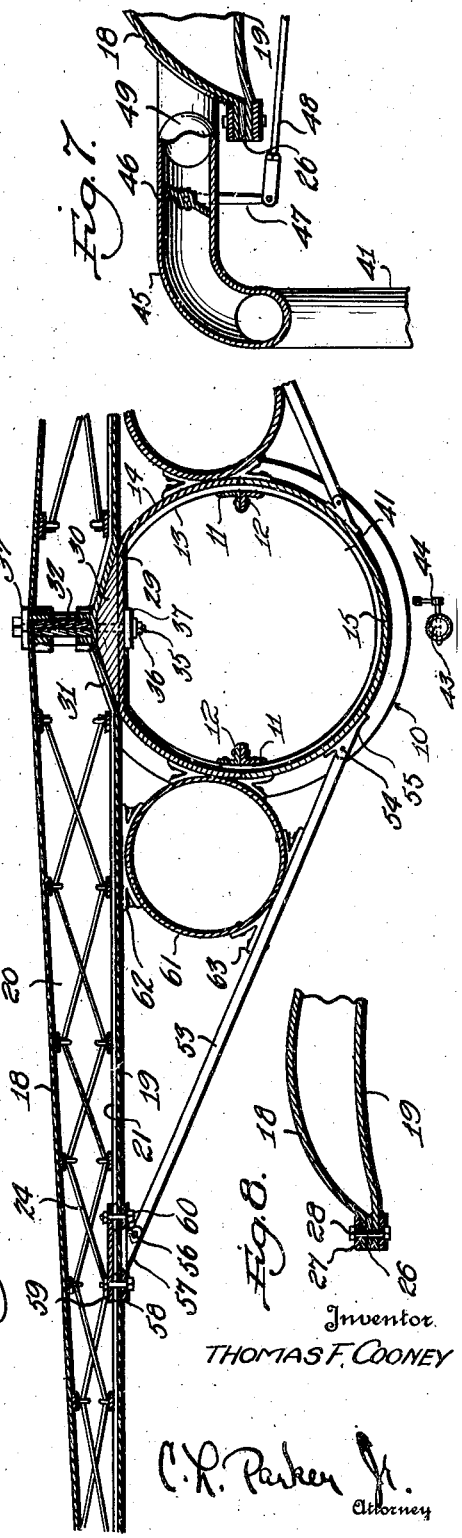
Inventor
THOMAS F. COONEY
By C. L. Parker Jr.
Attorney Patented Dec. 16, 1930

1,785,477

UNITED STATES PATENT OFFICE

THOMAS F. COONEY, OF LAS CRUCES, NEW MEXICO

AIRPLANE

Application filed September 5, 1928. Serial No. 304,062.

This invention relates to airplanes.

Under present conditions, an aviator is subjected to great hazards in flying during cold weather due to the accumulation of snow, sleet and hail upon the plane surfaces which have the effect of greatly weighting the plane and causing the handling of an airplane to be accomplished only with the greatest difficulty. This cause of difficulty constitutes a source of extreme danger to aviators, particularly when flying over large expanses of water.

Under the present practice of constructing airplanes it is quite difficult to replace broken parts without dismantling a considerable portion of the plane, such for example, as when one of the planes, or the fuselage or associated parts become damaged. This difficulty is due to the fact that airplanes at present are not constructed with readily replaceable parts, and due to the frequent damage to the supporting planes, it is desirable to supply some means whereby such a damaged plane can be readily and quickly replaced.

An important object of the present invention is to provide means for preventing or melting accumulations of ice, sleet, snow, etc., upon plane surfaces, and thus to eliminate such accumulations as a source of danger to aircraft.

A further object is to provide means for utilizing the heat of the exhaust gases from the engine for preventing or melting accumulations of ice, etc., upon the plane surfaces.

A further object is to provide an airplane construction wherein the exhaust gases from the engine may be completely discharged to the atmosphere or may be wholly utilized for preventing or melting accumulations of ice, etc., on the planes, or wherein the exhaust gases partially may be employed for the latter purpose.
A further object is to provide an airplane having hollow supporting wings of substantially gas-tight construction and provided with means associated therewith for admitting exhaust gases from the engine into the hollow planes for effecting the heating thereof to prevent or melt accumulations of ice, hail, etc.

A further object is to provide an airplane of the character referred to wherein exhaust gases are adapted, upon accumulation within the hollow planes, to escape therefrom through suitable valves which are adapted to seat to seal the planes against the ingress of water or other material when the motor is not running, or when the exhaust gases are not being transmitted to the interiors of the planes.

A further object is to provide a novel fuselage construction for an airplane which is adapted to be quickly and cheaply assembled as well as to be economically manufactured.

A further object is to provide a novel form of supporting plane structure which is detachable with respect to the fuselage to permit replacement of either of the wing structures in the event of damage occurring to the wings.

A further object is to provide novel means for bracing the wings with respect to the fuselage.

A further object is to provide an airplane construction of the general character referred to wherein the fuselage and wings are made wholly separate from each other and which are provided with contacting surfaces of material area, when assembled, whereby the cockpit of the aircraft may be heated by exhaust gases passing into the wings to render the operation of the plane more comfortable during cold weather and at high altitudes.

A further object is to provide novel means for attaching the supporting wings to the fuselage of the airplane.

Other objects of the invention will become apparent during the course of the following description.

In the drawings I have shown one embodiment of the invention. In this showing,

Figure 1 is a front elevation, Figure 2 is a side elevation,
Figure 3 is a section taken substantially on line 3—3 of Figure 2,
Figure 4 is a detail section on line 4—4 of Figure 3,

Figure 5 is a fragmentary plan view of a portion of the wing structure, parts being broken away, Figure 6 is a fragmentary enlarged sectional view taken substantially on line 6—6 of Figure 5, Figure 7 is a detail sectional view of a portion of the means for admitting exhaust gases to the wings, and, Figure 8 is a detail sectional view of one edge portion of one of the wings taken substantially on line 8—8 of Figure 5.

Referring to the drawings, the numeral 10 designates the fuselage of the airplane as a whole. The cross-sectional shape and longitudinal contour of the fuselage may correspond to standard and accepted practices. The fuselage is constructed on a frame each side of which constitutes a pair of angle irons 11 bolted together as at 12. At spaced intervals along the side frame members, hoops or bands 13 surround the frame members and are covered with upper and lower body plates 14 and 15, the edges of these plates preferably lying centrally of the frame members 11. The upper and lower flanges of the frame members are bolted or riveted as at 16 to both the bands 13 and the plates 14 and 15.

The plates 14 and 15 preferably form the upper and lower halves respectively of the fuselage, but this structure may be altered if desired, according to the individual requirements. For example, the fuselage is illustrated as having frame members 11 arranged at opposite sides substantially centrally of the height of the fuselage, but it will be apparent that any number of the frame members may be arranged within the fuselage extending longitudinally thereof. It also will be apparent that the plates 14 and 15 may be made of any desired number of sections. In assembling the fuselage, the side frame members are clamped together and drilled to provide openings for the various bolts, whereupon they are bent on a template to give them the desired longitudinal contour. While the frame members are held in position with respect to the template preferably by bolting them thereto, the hoops 13 are placed in position, whereupon the plates 14 and 15 are bolted in place, and the template may be removed.

A supporting wing indicated as a whole by the numeral 17 extends from each side of the fuselage. These wings are identical in construction and only one need be referred to in detail. Each wing comprises an upper and lower sheet metal plate 18 and 19 which are spaced apart to provide the proper upper and lower wing contours, and the spacing of the plates provides an inner chamber 20 for a purpose to be described. The upper and lower plates of the wing are provided with longitudinal and transverse bracing bars 21 and 22 respectively and also may be provided with diagonally arranged bracing bars 23. The bracing members may be supplemented if desired, by angular trusses 24, as shown in Figure 6. Each wing 17 is provided with an aileron 25, which may be of any desired construction, and forms no part of the present invention.

In constructing the wings, it is desired that they form a substantially gas-tight chamber 20, and to this end, a gasket 26, preferably made of asbestos is interposed between the edge portions of the plates 18 and 19, as shown in Figure 8. Clamping plates 27 are arranged against the outer portions of the joint formed between the wing edges, and the entire joint structure is secured together by bolts or other fastening elements 28.

Novel means is employed for mounting the wing structures with respect to the fuselage. As shown in Figure 6, the fuselage is flattened as at 29 at the point at which the wings are attached to the fuselage, and this flattened portion 29 supports a thrust block 30 which may be formed of wood. The thrust block is provided with opposite downwardly inclined upper faces against which fit the inner inclined end portions 31 of the lower wing plates 19. Plates 32 form closures for the inner ends of the wings and also serve to support the upper and lower plates 18 and 19 with respect to each other. The plates 32 are bolted or otherwise secured together as at 33 and the plates are bulged at spaced intervals as at 34' to provide openings for the passage of bolts 35 which extend above the plates 18 and downwardly through the flattened portion 29 of the fuselage. Nuts 36 on the ends of the bolts 35 engage clamping plates 37, which are clamped against the upper plates 18 and against the lower face of the flattened fuselage portion 29.

Any suitable form of motor may be employed, and in the present instance an engine 48 is shown having radial cylinders 39 each of which is provided with an exhaust pipe 40 communicating with an annular exhaust manifold 41. As shown in Figure 6, an outlet pipe 42 communicates with the bottom of the annular exhaust manifold and is adapted to discharge exhaust gases to the atmosphere. A valve 43 controls passage of gases through the outlet pipe and is operated by a crank 44 controlled in any suitable manner from the operator's cockpit by means not shown.

As shown in Figure 7, an outlet pipe 45 also communicates with the top of the manifold 41 and is controlled by a valve 46 connected to an operating lever 47. This lever is controlled by a rod 48 which leads to the operator's cockpit, and if desired, the operating means for the valves 43 and 46 may be so arranged that these valves may be operated in unison in such a way that the valve 43 will be progressively closed as the valve 46 is progressively opened, and vice versa. The pipe 45 communicates with branch pipes 49 which are adapted to discharge exhaust gases from the engine respectively into the chambers 20 of the two wing structures.

It is desirable of course, to prevent the accumulation of pressure in the exhaust gases within the wing chambers 20, and to this end suitable relief valves 50 are associated with the wings preferably at the outer tips thereof. Each valve may seat against the outer end of a tubular member 51, and a light spring 52 may be employed for tending to hold the valve in closed position. The springs however, should be of such degree of tension that they are adapted to open readily under the influence of relatively slight pressures within the wing chambers. The valves 50 have been shown merely for the purpose of illustration and it will be apparent that any type of relief valve may be employed.

Suitable struts 53 are connected between the supporting wings and the lower portion of the fuselage. Each of these struts is connected by a bolt or the like 54 to a lug 55 connected to the fuselage. At its upper end, each strut is bolted or similarly secured as at 56, to a lug 57 preferably formed integral with a plate 58 arranged against the bottom wing plate 19. A corresponding plate 59 is arranged within the wing against the upper surface of the plate 19, and the plates 58 and 59 may be secured together by bolts 60.

Air or fuel tanks 61 are preferably arranged beneath the wings on opposite sides of the fuselage. These tanks may be secured to the wings and to the struts 53 by suitable brackets 62 and 63. It will be apparent that the tanks serve to contain air to render the ship buoyant or may contain fuel for the engine, and may serve the added function of providing bracing means for the struts.

The plane is adapted to be driven by the usual type of propeller 64, and lateral balance is accomplished by the customary operation of the ailerons 25. The rear end of the fuselage is provided with the usual rudder 65 and elevators 66.

The operation of the airplane is as follows: The controls for the aircraft are similar to those in common use, and obviously the plane is controlled in flight in accordance with the usual practice. During the normal operation of the airplane under average temperature conditions, the valve 46 is closed and the valve 43 is opened to discharge exhaust gases directly to the atmosphere from the annular manifold 41, it being understood of course that each individual cylinder exhausts gases into the manifold through the pipes 40.

When flying is done in extremely cold weather, or at high altitudes, the valves 43 and 46 may be partially opened, or the valve 43 may be closed and the valve 46 opened to permit all of the exhaust gases to be discharged into the hollow wings of the airplane. Under such conditions, the hot exhaust gases will maintain the wings of the airplane at an elevated temperature, and thus will prevent or melt accumulations of ice, hail, snow, and sleet. Thus one of the great sources of danger of winter flying is removed. In addition to the heating of the wings, it will be apparent that the fuselage also will be heated, at least to some extent, to render the driver's compartment more comfortable.

Obviously, it is necessary to release pressure from the hollow wings when the exhaust gases are conducted thereto. Accordingly the relief valves 50 are employed, and these valves are normally closed by their springs 52 which are lightly tensioned and which are adapted to flex readily under the influence of the pressure of the exhaust gases in the wings to permit the gases to escape therefrom. Obviously, the valves 50 close as soon as the engine stops, and the wings therefore provide water-tight compartments which assist in rendering the airplane as a whole buoyant in the event of a forced landing upon a body of water.

The tanks 61 serve to brace the struts 53, and also serve to add buoyancy to the airplane to prevent it from sinking if it is forced to land upon water. Thus it will be apparent that the plane is rendered particularly safe for transoceanic or other flying over large expanses of water since the formation of ice on the wings is prevented, and the plane is rendered self-buoyant.

Particular attention is invited to the structure of the fuselage and of the wings. The angle iron members 11 are clamped together and bent to conform to the shape of suitable templates, whereupon the spaced bands or hoops 13 are bolted in position, and retain the proper longitudinal contours of the members 11. The previously shaped plates 14 and 15 are then bolted or riveted in position. This construction and mode of assembling renders the fuselage cheap to manufacture and economizes in the labor necessary in assembling the structure.

It will be noted that each of the wings of the plane constitutes a separate and complete structure in itself. Each wing is made complete before it is assembled, and it is a simple matter to keep spare wings in stock for replacement purposes if a wing of a ship should become damaged. The wing structures are maintained in position on the thrust block 30 by means of the bolts 36, and the end portions of the wings are braced in position by the struts 53 which are readily attachable and detachable. The manner of clamping the upper and lower plates of the wings together, as shown in Figure 8 renders the wings gas and water tight to prevent leakage of exhaust gases from the wings except as controlled by the valves 50, and to prevent water from leaking in the wings in the event of a forced landing on water.

It is to be understood that the form of the invention herewith shown and described is to be taken as the preferred example of the same and that various changes in the shape, size and arrangement of parts may be resorted to without departing from the spirit of the invention or the scope of the subjoined claims.

I claim:—

1. An airplane comprising a main structure including a fuselage and supporting wings, a portion of said structure being provided with a chamber for receiving exhaust gases from the motor of the airplane, a conduit for conducting exhaust gases from the motor to said chamber, and an outwardly opening check valve associated with said chamber and operable to open under the influence of the pressure of exhaust gases in the chamber.

2. An airplane comprising a fuselage, a pair of hollow supporting wings secured to said fuselage, an internal combustion engine forming the source of power for the airplane and including an exhaust manifold, means for conducting exhaust gases from said manifold to the interior of said wings, and an outwardly opening check valve mounted in the end portion of each wing and adapted to open under the influence of the pressure of exhaust gases in the wings.

3. An airplane comprising a fuselage, a pair of supporting wings secured to said fuselage and each including upper and lower plates having their edge portions arranged parallel and in proximity to each other, the remaining portions of said plates being spaced to form a chamber in each wing, gaskets arranged between the edge portions of said plates, means for clamping the edge portions of said plates against said gaskets, an internal combustion engine for driving the airplane, and means for conducting exhaust gases from the engine through said chambers.

4. An airplane constructed in accordance with claim 3 wherein said means comprises an exhaust manifold associated with the engine, a conduit communicating at one end with said manifold, branch pipes communicating between said manifold and said chambers, a valve controlling passage of gases through said conduit, said manifold being adapted to communicate with the atmosphere, and a valve adapted to control communication between said manifold and the atmosphere.

5. An airplane comprising a fuselage, a thrust block mounted on said fuselage adjacent its forward end, a pair of hollow wings extending on opposite sides of said fuselage and having their inner ends mounted on said thrust block, closure plates for the inner ends of said wings, fastening means for securing said plates to each other, and means for securing said wings at their inner ends to said thrust block and said fuselage, said thrust block being provided on opposite sides with upper faces inclined downwardly toward the edges of the block, each of said wings including upper and lower plates, the inner portions of said lower plates being inclined similar to and lying against the inclined faces of said thrust block.

6. An airplane comprising a fuselage, a thrust block mounted on said fuselage adjacent its forward end, a pair of hollow wings extending on opposite sides of said fuselage and having their inner ends mounted on said thrust block, closure plates for the inner ends of said wings, fastening means for securing said plates to each other, means for securing said wings at their inner ends to said thrust block and said fuselage, struts connected between the lower portion of said fuselage and said wings at points spaced from said fuselage, and tanks arranged in the spaces between and secured to said struts, said wings and said fuselage.

7. An airplane constructed in accordance with claim 6 wherein each of said wings comprises upper and lower plates secured together at their edges and spaced throughout the remainder of their areas, and internal bracing means within each wing for maintaining the shape of the spaced portions of said plates.

8. An airplane constructed in accordance with claim 6 wherein said thrust block is provided on opposite sides with upper faces inclined downwardly toward the edges of the block, each of said wings comprising upper and lower plates secured at their edges and spaced throughout the remainder of their areas, the inner portions of said lower plates being inclined similar to and lying against the inclined faces of said thrust block.

9. An airplane wing comprising upper and lower plates having their edges arranged parallel and adjacent to each other and their remaining portions spaced apart and curved transversely, a gasket arranged between the edge portion of said plates, clamping plates lying against the outer faces of the edge portions of said first named plates, and fastening elements passing through said first named plates, said gasket and said clamping plates.

10. An airplane constructed in accordance with claim 9 provided with a plate forming a closure for the inner end of said wing and adapted to maintain the inner end portions of said first named plate in spaced relation.

11. An airplane comprising a fuselage, a pair of supporting wings secured to said fuselage and each including upper and lower plates secured at their edges and spaced throughout the remainder of their areas to form a chamber, an internal combustion engine forming the source of power for the airplane and including an exhaust manifold, a conduit connected between said manifold and the atmosphere, a second conduit connected at one end to said manifold, branch pipes connected between said second conduit and said chambers, manually controlled valves controlling the passage of exhaust gases through said conduits, and an outwardly opening check valve mounted in the end portion of each wing and adapted to open under the influence of the pressure of exhaust gases in the wings.

In testimony whereof I affix my signature.

THOMAS F. COONEY.